THOMAS A. HUTSELL
Inventor

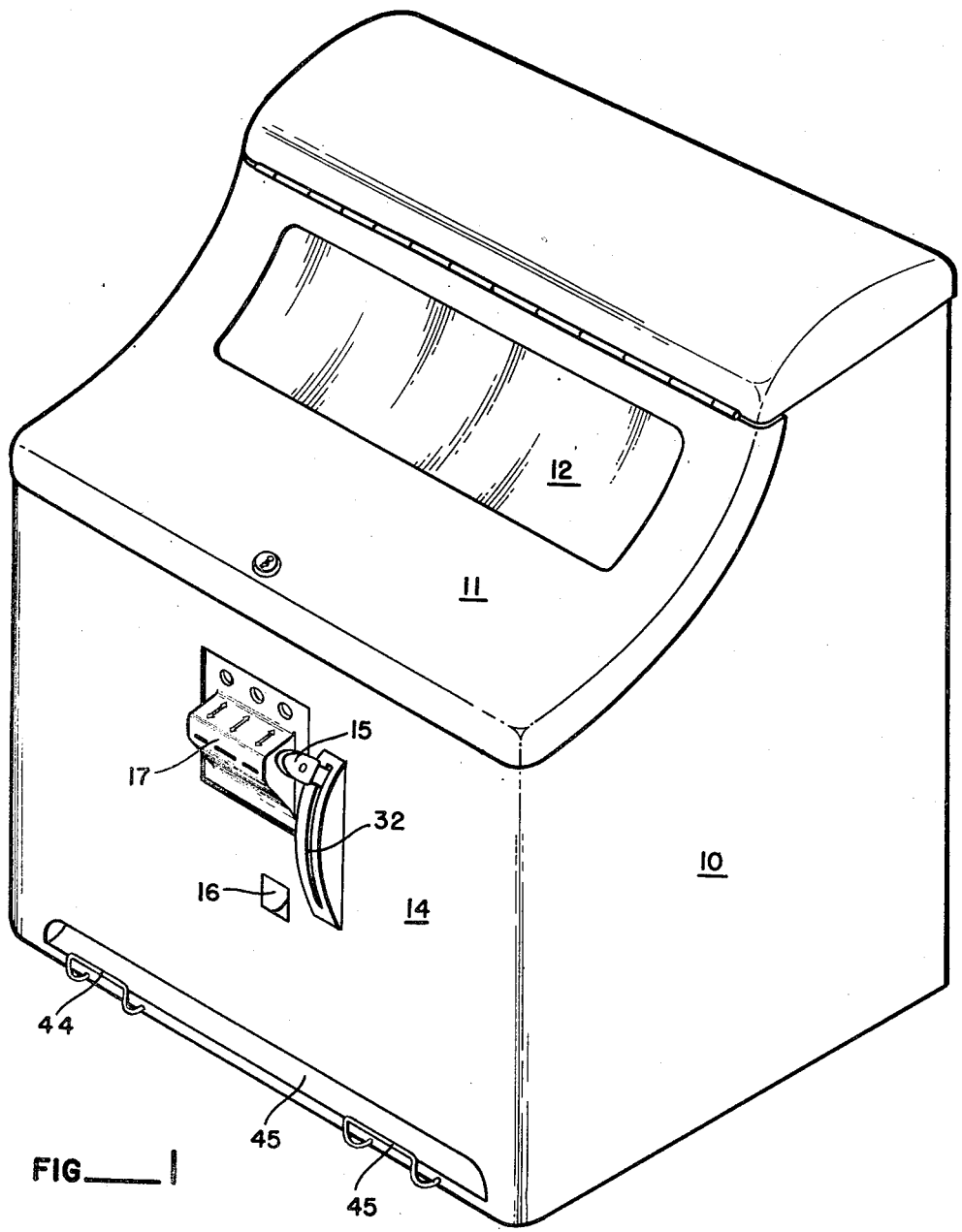

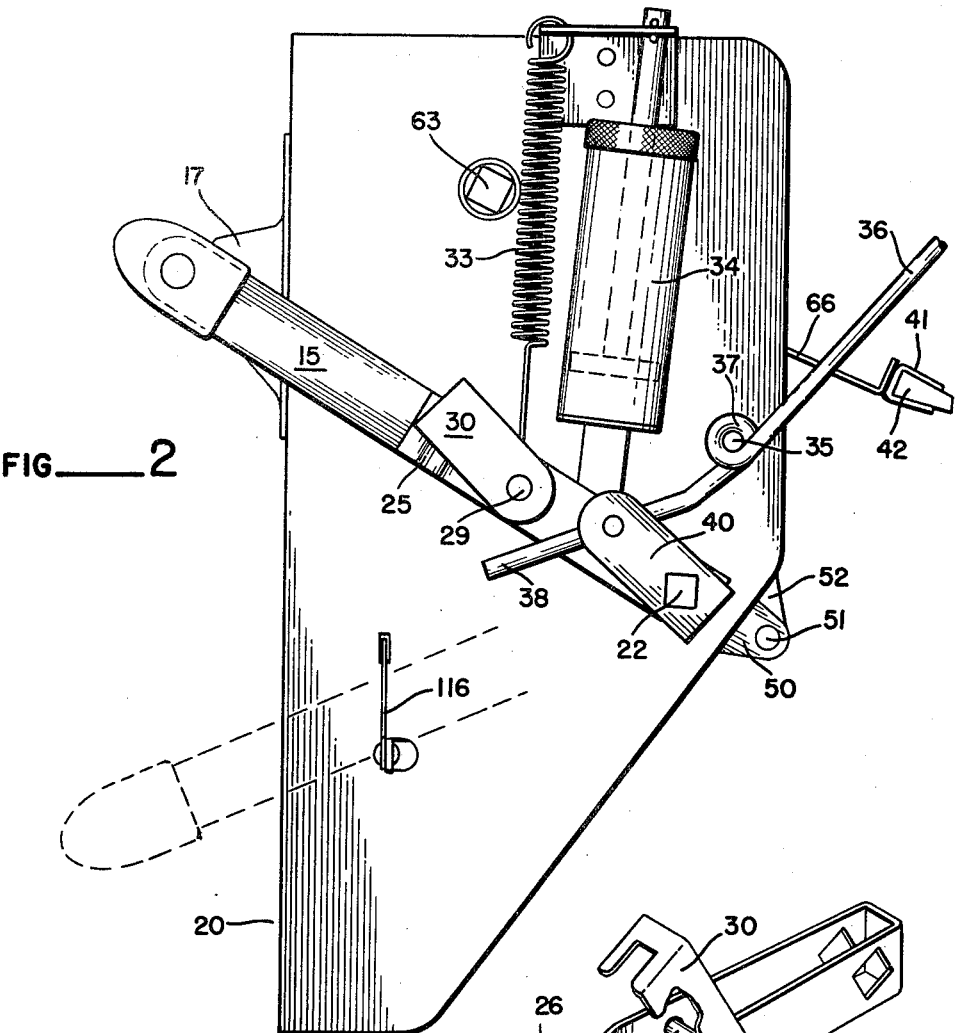
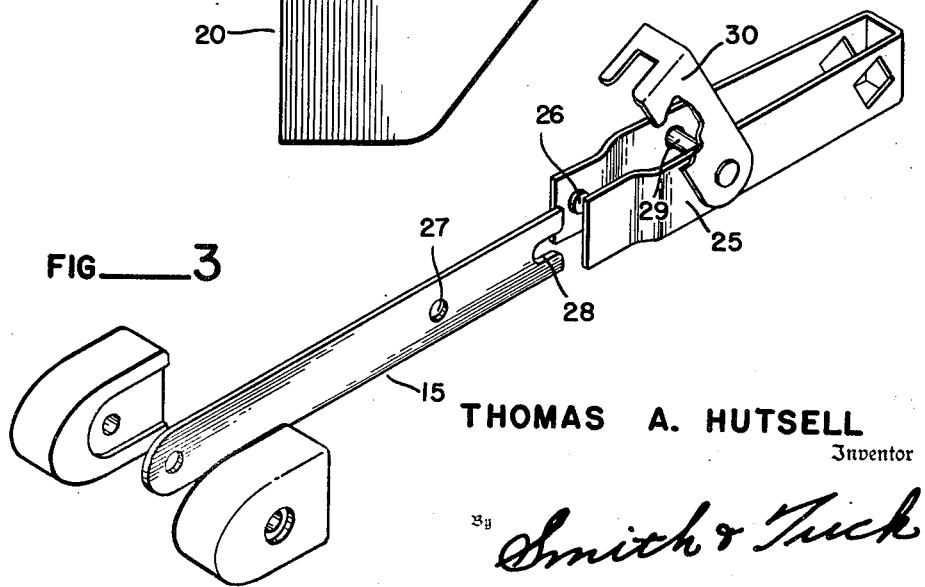

By Smith & Tuck
Attorneys

FIG__6

April 12, 1955 T. A. HUTSELL 2,706,029
COIN CONTROLLED MECHANISM FOR VENDING MACHINES
Original Filed Nov. 1, 1949 8 Sheets-Sheet 6

THOMAS A. HUTSELL
Inventor

By Smith & Tuck
Attorneys

April 12, 1955     T. A. HUTSELL     2,706,029
COIN CONTROLLED MECHANISM FOR VENDING MACHINES
Original Filed Nov. 1, 1949     8 Sheets-Sheet 7
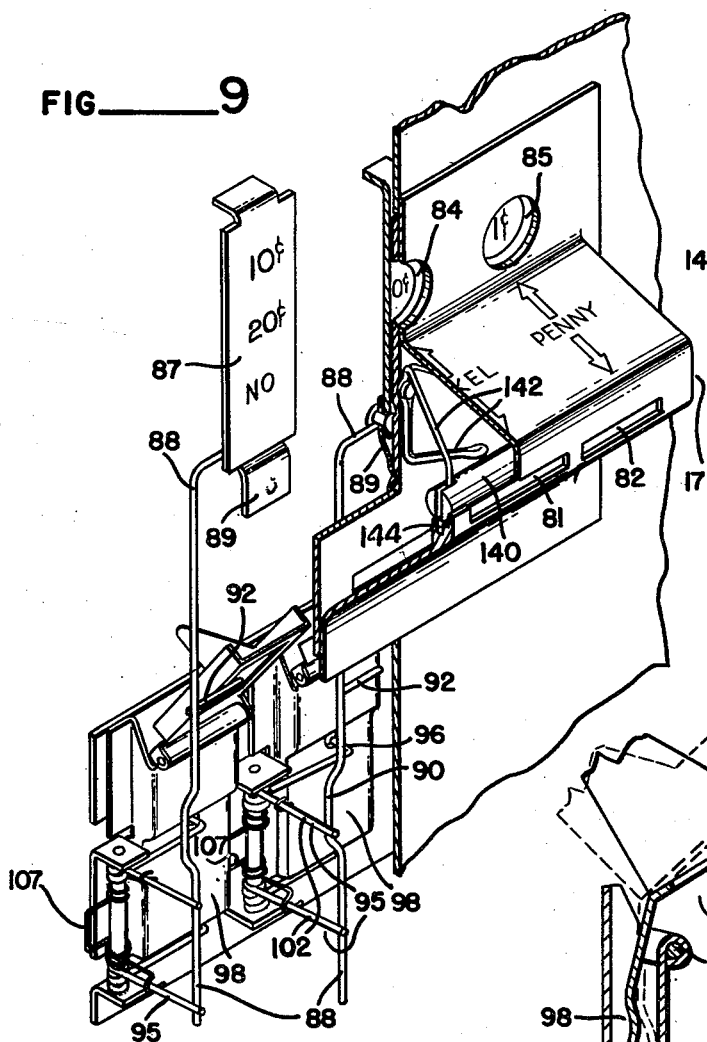
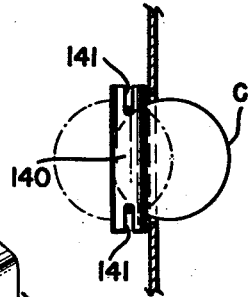
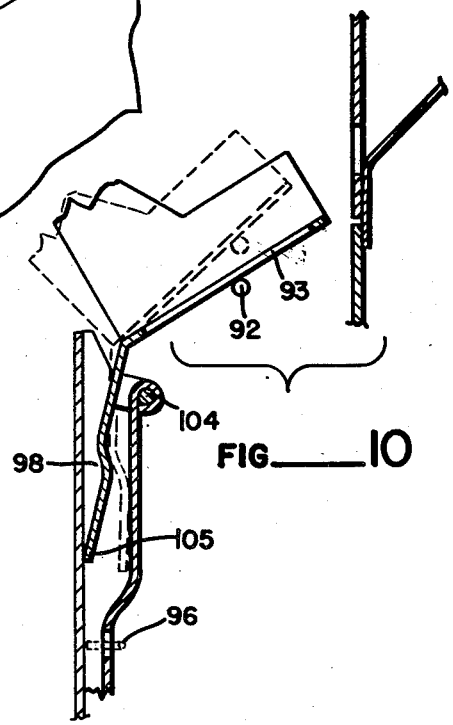
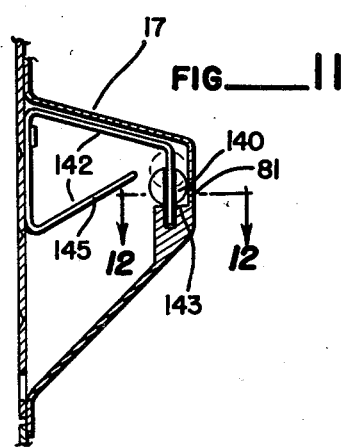
THOMAS A. HUTSELL
Inventor
By Smith & Tuck
Attorneys April 12, 1955 T. A. HUTSELL 2,706,029
COIN CONTROLLED MECHANISM FOR VENDING MACHINES
Original Filed Nov. 1, 1949 8 Sheets-Sheet 8
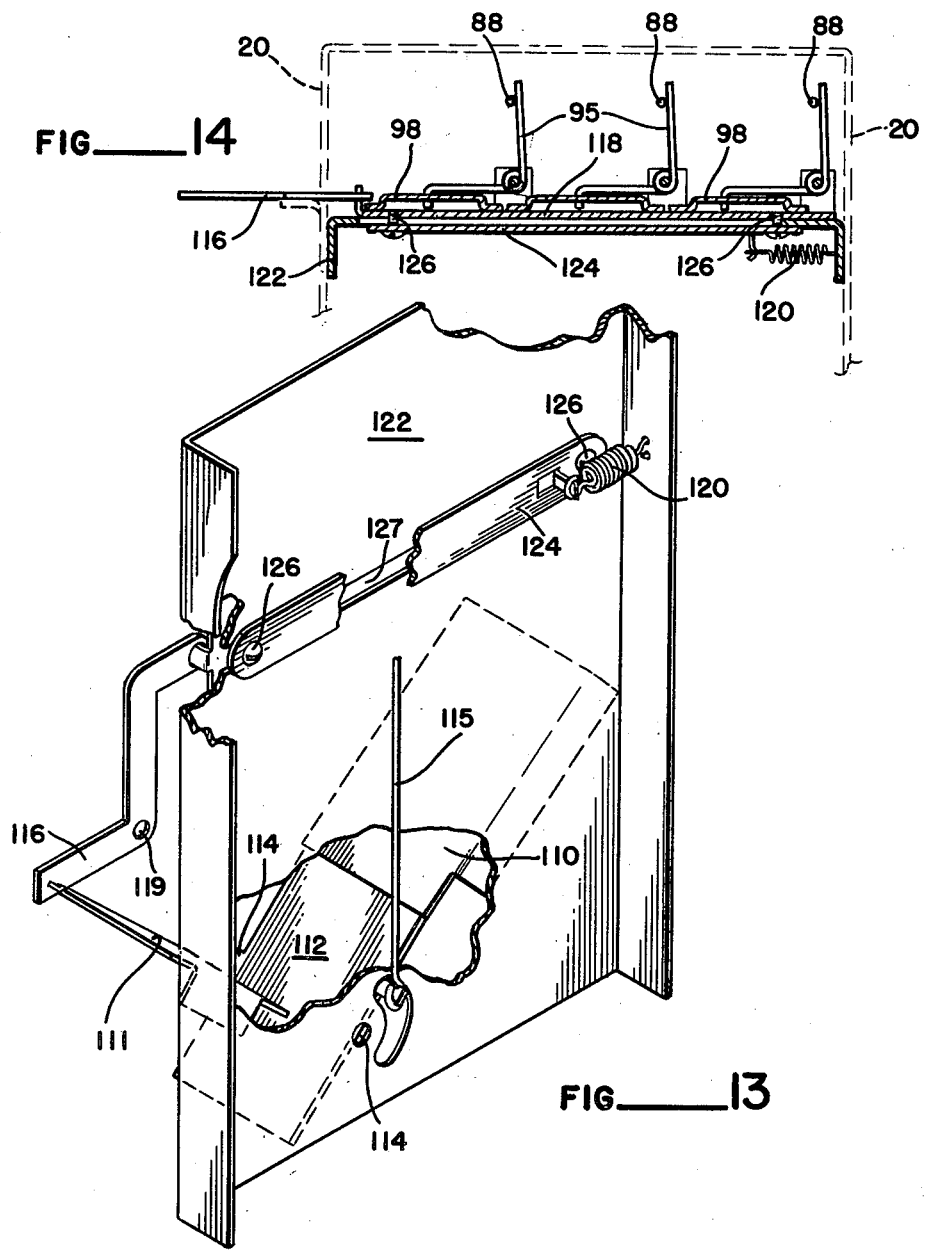
THOMAS A. HUTSELL
Inventor
By Smith & Tuck
Attorneys

United States Patent Office 2,706,029
Patented Apr. 12, 1955

2,706,029

COIN CONTROLLED MECHANISM FOR VENDING MACHINES

Thomas A. Hutsell, Renton, Wash.

Original application November 1, 1949, Serial No. 124,799. Divided and this application August 17, 1951, Serial No. 242,354

10 Claims. (Cl. 194—73)

This present invention is a divisional application covering the coin controlled mechanism disclosed in my co-pending U. S. patent application, Serial No. 124,799, filed November 1, 1949, entitled "Paper and Periodical Vending Machine." This present application illustrates and describes a particular type of coin controlled mechanism together with the essential associated parts adapting this mechanism for use in vending newspapers and other periodicals. One essential requirement of this form of mechanism is that the coin controlled mechanism be capable of convenient adjustment and be provided with adequate coin locks so that it can be set easily to vend periodicals for varying total amounts and that these totals may be made up of several different pre-set combinations of coins.

Coin controlled mechanism have been highly developed over long periods of years and many excellent mechanisms are available for specific purposes. This present invention relates to a specific form of structure which is adopted primarily for a very specific purpose, namely that of selling periodicals and newspapers, the price of which very often changes with different editions, and especially the Sunday editions as distinct from the daily editions. Further when periodicals are sold at a price of 16 cents and up, it is apparent that there are a number of coins required to make this total and there are several different combinations of coins which can be employed to add up to the required total. In this device the mechanism can be set to make use of the coins most predominant in a certain locality. This basic requirement therefore has imposed an unusual requirement on this mechanism and the solution submitted herewith has proved a very satisfactory one for the purpose.

The principal object of this present invention is to provide a coin controlled mechanism for periodical vending machines, which contains all the essential elements within a single housing, so attached that this mechanism can be removed easily and quickly from the vending machine for purposes of service, repair, or adjustment.

A further object of this present invention is to provide a coin controlled mechanism which will be capable of releasing the vending mechanism when an indicated aggregate of lawful coins has been inserted.

A further object of this invention is to provide a coin controlled mechanism which will be capable of operation by an aggregate number of coins which total the given sales price and by proper setting be capable of varying the aggregation required.

A further object of this invention is to provide a coin controlled mechanism which will sort out improper coins and which will return all the coins to the working purchaser if the coins do not add up to the proper money value.

A further object of this invention is to provide a coin controlled mechanism in which the actuating means is so arranged that the mechanism itself will not be damaged due to the improper or forceful manipulation of the actuating handle.

Further objects, advantages and capabilities will be apparent from the description and disclosure in the drawings, or may be comprehended or are inherent in the device.

In the drawings:

Figure 1 is a perspective view illustrating one form of my coin controlled mechanism as applied to a newspaper vending machine;

Figure 2 is an end view showing in elevation the operating handle end of my coin-controlled mechanism;

Figure 3 is a perspective view, broken away and sectional in part, showing, in spaced apart relationship, the elements forming my control handle;

Figure 9 is a perspective view taken substantially along the line 9—9 of Figure 4 and illustrates the general functioning of the price selector and coin director mechanism;

Figure 10 is a bracketed typical transverse sectional view through the coin tumbler and chute;

Figure 11 is a cross sectional view of the coin receiver assembly;

Figure 12 is a cross sectional view taken substantially along the plane indicated by line 12—12 of Figure 11;

Figure 13 is a fragmentary perspective view, partly in section, with certain parts broken away, illustrating the coin director and coin release mechanisms; and Figure 14 is a horizontal sectional view illustrating the coin stop mechanism and certain allied parts further illustrating the mechanism shown in Figure 9.

Figure 4:
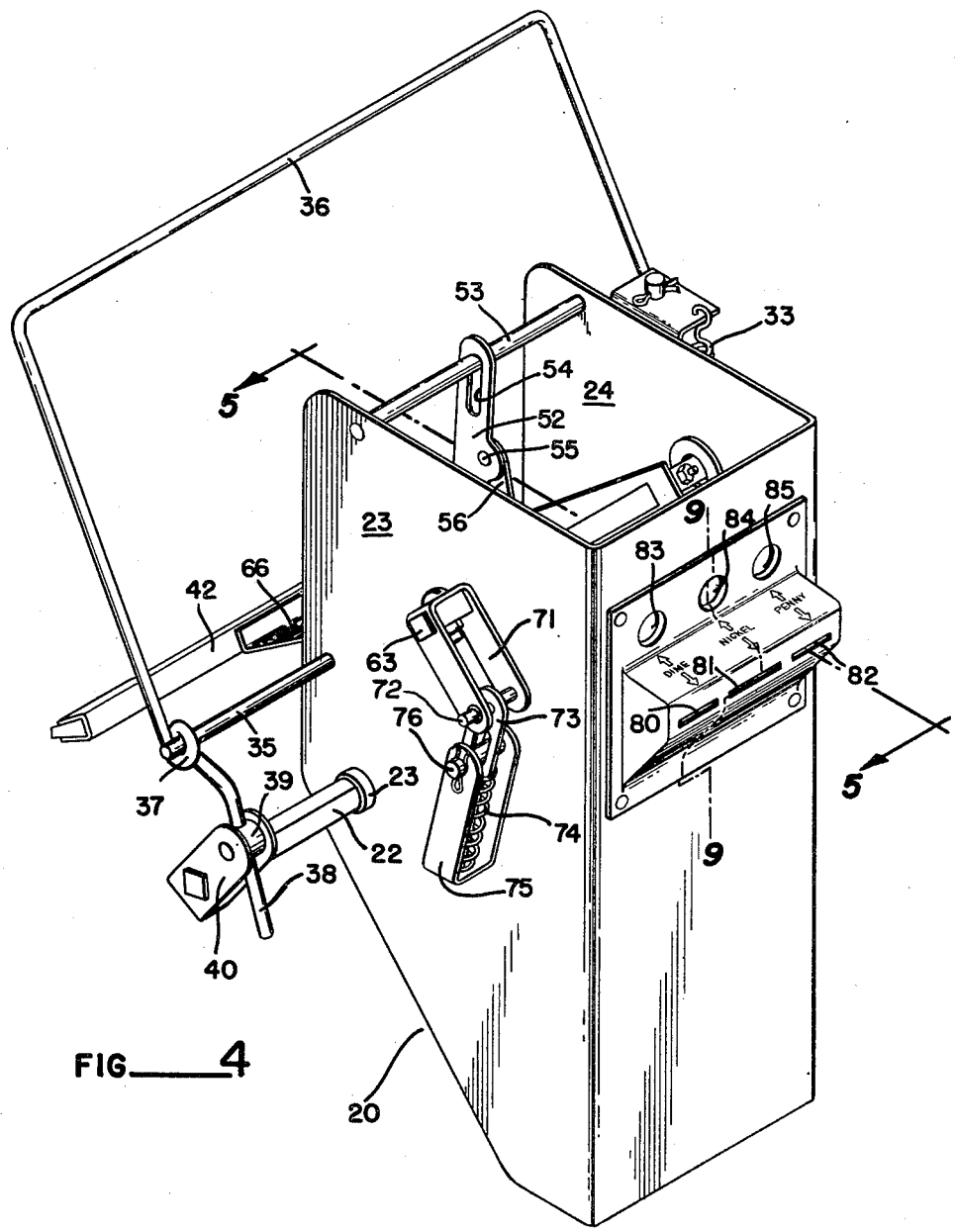
Figure 4 is a perspective view showing generally the front of my mechanism together with the side opposite from that shown in Figure 2; certain parts are shown external of the housing as they form part of the control mechanism.

Referring more particularly to the disclosure in the drawings, the numeral 10 designates generally the housing for a newspaper or periodical vending machine. This is provided with a hinged cover member 11 normally provided with a transparent inspection window 12. In the front face plate 14 of cabinet 10 are cut out portions through which portions of the coin controlled mechanism extend. These members consist of the operating handle 15, the coin returning port 16 and the coin receiver and price designating cover 17.

The coin controlled mechanism is provided as a single replacement unit and is illustrated generally in Figure 4. It is provided with a preferably sheet metal U-shaped housing 20 and all the various parts associated with the coin control means are secured to, or within, housing 20. Provision is then made by any one of many ways of securing housing 20 on the inside face of plate 14. A convenient expedient is the use of clips or metal screws. The main operating or mechanical shaft 22 is journaled in bosses formed in legs 23 and 24 of housing 20 and extends outwardly from each of these legs. Referring to Figure 2, it is to be noted that the handle 15 is secured to shaft 22 by means of the handle yoke 25. Yoke 25 is provided with a detent 26 adapted to engage opening 27 on handle 15. The extreme inward end of handle 15 is provided with an open slot at 28 which coacts with pivot pin 29 to hold the handle as a working part of yoke 25. Yoke 25 is formed of a resilient material and the handle lock 30, pivoted upon the pin 29, is pressed downwardly as used in Figure 3 after the handle has been assembled within the handle yoke. This forces the two side legs of the yoke into tight engagement with the handle member and insures operable engagement of detent 26 and hole 27. This completes the locking arrangement which makes it possible to withdraw handle 15 very easily as is necessary in order to remove housing 20 and its associated parts from cabinet 10, handle 15 being withdrawn outwardly through the arcuate slot 32. A return spring 33 is provided to restore handle 15 always to the uppermost position when it is released, and an oil check cylinder and co-operating piston 34 are provided on one hand to check the upward throw, and on the downward movement of the lever these serve to slow down the movement of the lever to a safe speed that will insure the proper functioning of the various parts, and particularly the movement of the paper or periodical during the dispensing cycle.

Adapted to be pivotally supported on diametrically extending ends of pivot rod 35 is the paper holder 36.

This unit is bail-like in form and is provided with bends at 37 which form bearings which in turn encircle the pivot rod 35. The bail is actuated by the downwardly extending arms 38 which are slidably positioned in rocking nuts 39 which are pivotally mounted within the pusher crank throws 40. There are two of these throw members 40 one disposed on each end of shaft 22 outside the housing 20. Paper holder 36 holds the papers in proper position for vending and then because of the resilient nature of the same holds the periodicals quite securely so it is necessary to release this pressure during the vending cycle. Consequently it is therefore believed that the actuating means, as immediately described, forms a component of this mechanism.

Figure 5:
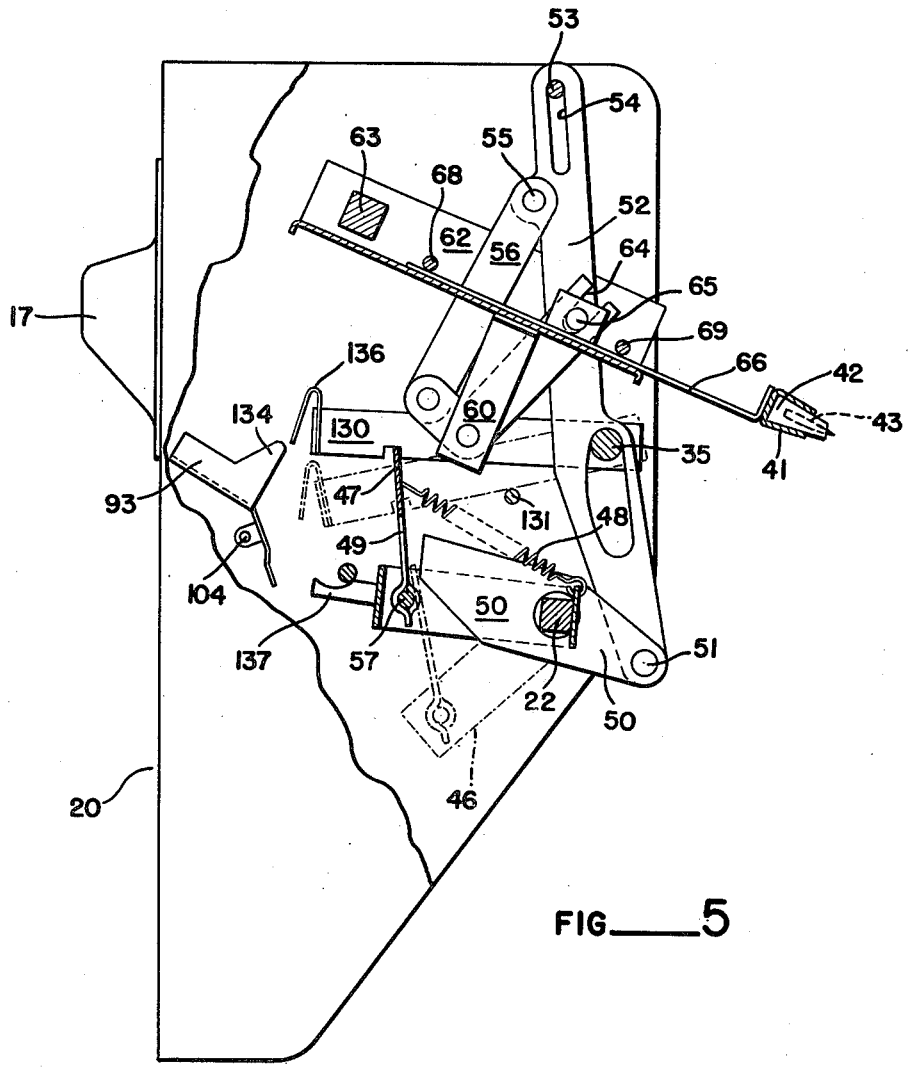
Figures 5, 6 and 7 are cross sectional views taken substantially along the plane indicated by line 5—5 of Figure 4; one side of the housing is shown as broken away.

Another essential operating member, operating outside of the housing 20, is the vending bar 41. This is a substantially U-shaped metal member proportioned to extend horizontally across the periodical while being narrow enough to pass freely between the arms of the paper holder 36. In cross section bar 41 is closed partially at the open end of the U to grip a plurality of resilient cushions 42. Disposed in longitudinally-spaced relationship within cushions 42 is a plurality of periodical engaging points 43. A convenient form for these points is the conventional steel phonograph needle, the base end of which is embedded in the resilient material together with a portion of the tapered point to the end that a firm engagement is thus provided by the slightly protruding point. The functioning of vending arm 41 will thus be understood by a study of Figures 5, 6 and 7. In Figure 5 the vending arm is shown in its lower extended position; in Figure 6 in the partially raised position, used to raise the periodical above the bottom retaining ledge, which is not illustrated in this present application; and in Figure 7 the upward limit of the stroke is shown together with a retraction of the vending arm as occurs when the periodical is dispensed. This is achieved merely by withdrawing the holding member from the periodical and letting it drop under the influence of gravity so it will fall to the low point of the machine and come to rest against stop members 44 while lying within slot 45. In this position the paper can be grasped by the fingers and pulled out of the machine.

*Vending arm assembly*

The vending arm is caused to operate as downward pressure is applied to the end of handle 15. Mechanical shaft 22 is disposed to revolve partially counter-clockwise as viewed in Figures 5, 6, and 7 since the handle 15 is fixed thereto and this carries with it yoke 46 which is also fixedly secured to shaft 22. Pivotally mounted on pin 57 within yoke 46 is dog plate 47 best shown in Figure 8. Dog 47 has an opening 49 positioned to engage catch 50 when yoke spring 48 shown in Figure 5 is allowed to operate, which occurs only when the correct coin or coins have been inserted as will be described later. The catch 50 is mounted pivotally upon mechanical shaft 22 and is actuated from shaft 22 through means of dog 47, and when continued pressure is exerted on handle 15, the outer end of catch 50 moves upwardly and then by means of pivot 51 moves link stop 52 upwardly. The upper end of link stop 52 is guided by fixed shaft 53 within the elongated slot 54 which is cut in the upper end of the link stop member. Pivotally secured to link stop 52 at 55 is link 56. At its lower end link 56 is pivotally secured to the bell crank shaped cam 58. The apex of the bell crank is pivoted at 59 to a bracket 60 which is, in turn, fixedly secured to the underside of the slide guide 62. This slide member is fixedly secured to a rotatably mounted vending shaft 63. The upper end of cam 58 is bifurcated to form the slot 64 that accommodates a pivot pin 65 which is fixed to the vending slide 66. Slide stop members 68 and 69 hold the vending slide into sliding engagement with the slide guide 62 and also form abutments for the bearings of pivot 65 at each end of the limits of its movements. The general functioning of this mechanism is in effect to give substantially straight line lifting movement to the periodical during the beginning of the dispensing cycle and then to withdraw the distending arm from contact with the periodical and then to restore the vending arm to the position of Figure 5 by keeping the points 43 well away from the reserve periodicals to be dispensed during the return cycle.

The withdrawal of vending arm 42 from contact with the periodical and the return thereto is achieved through the energizing of shaft 63 by the toggle mechanism shown in Figure 4. This consists of the toggle link 71 which is fixedly secured at one end to shaft 63 and is connected at its other end by toggle pin 72. This toggle pin is rotatably mounted in the toggle slide 73 which in turn bears upon the spiral compression spring 74 housed within the spring stay 75 which member in turn is pivotally supported by the rod 76 which is fixedly secured to housing 20. Following the principles of spring actuated toggles, as soon as pin 72 is forced beyond the line joining rod 76 and shaft 63, spring 74 takes over and completes quickly the partial revolution of shaft 63.

*Coin collectors*

Figures 9 through 14 show the various elements employed to select or reject coins. Protruding through the front of the cabinet is the coin receiver 17 in which are a series of coin inlet slots 80, 81 and 82. Immediately above these slots and aligned with them are corresponding ports 83, 84 and 85 through which is indicated the money value in a given number of coins which the machine requires to make a delivery, and in order to make the machine easily set for varying denominations, the price indicator slides 87 are disposed immediately behind ports 83, 84 and 85. These slides operate in guideways and are held in place by leaf springs 89 attached to the slides, or if desired, may be locked in position by clamping screws. Attached to each slide 87 and extending downwardly are the price control rods 88. These are guided suitably normally at their lower ends, by guide means that are not shown for the sake of clarity of illustration, and they are each provided with a cam portion as at 90. Each of the price control rods 88 has secured to it the horizontal tumbler lifter 92. This lifter is so disposed as to revolve tumbler 93 from the full line position to the dotted line position as shown in Figure 10. This is used to make the coin opening inoperative and such an arrangement has been shown in Figure 9 wherein the left hand slide 87, as used, is in a position with the tumbler lifted. In this position any coin passed through coin slot 80 will not be engaged by the tumbler and will thereby fall down and out through the coin return chute.

When the slide 87 is fully or partially depressed, as when that coin slot is to be used, this lowers the tumbler 93 to a position where coins will be directed by it into coin tube 98. Coin tubes 98 are each equipped with a pair of coin stops 95 one of which is at the lower extremity of the coin chute and the other positioned approximately half way up the coin chute. These coin stops are formed of wire and one end as 96, extends into the coin chute so that it does not allow any coins to pass through while in this position. These coin stops, which are pivotally mounted, are normally held in the stop position by a spring 107.

Figure 6:
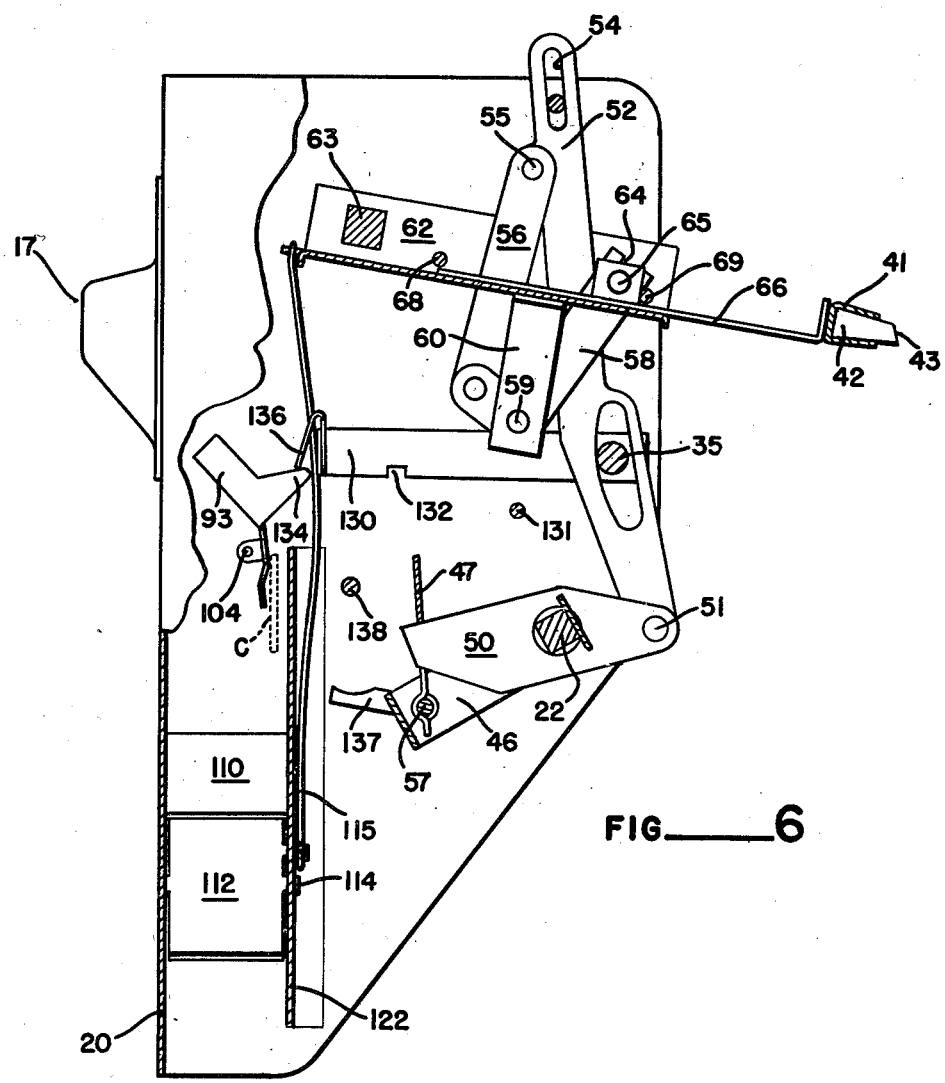
Figure 7:
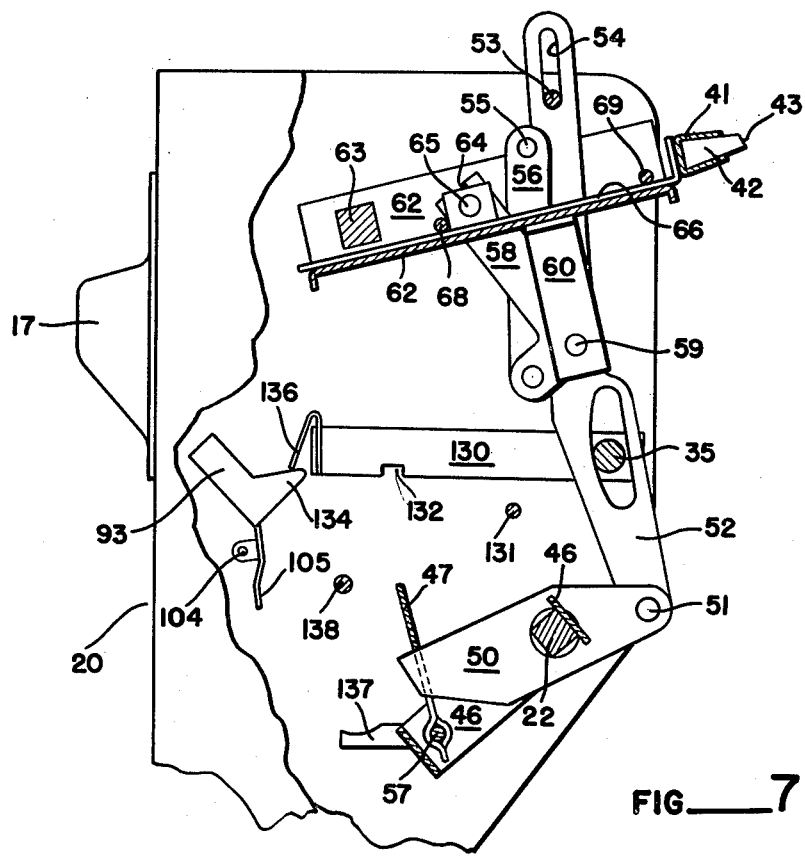
Figure 8:
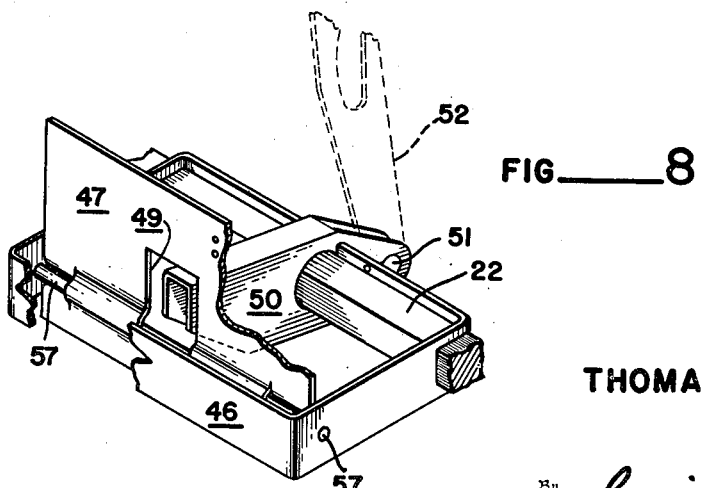
Figure 8 is a fragmentary perspective view of the means employed for transmitting power from the handle assembly to the vending assembly.

The position of the tumbler 93 shown in dotted lines in Figure 10 is shown in solid lines in Figures 6 and 7 wherein the tumbler has been rotated so the extending lug 134 is in the path of reset spring 136 which is fixedly secured to finger 130. Thus the finger 130 is held against rotation. In Figures 9 and 10 tumbler 93 is illustrated as having a framed, open floor; this construction permits undersized coins to drop straight through and never be directed into the coin chute.

If one or more of the fingers 130 is allowed to follow dog 47 down, it rotates about its axis 35 until it strikes the finger limit shaft 131 as shown in dotted lines in Figure 5. At this point dog 47 is pulled free of notch 132, but the opening 49 is below the catch 50 so no engagement will occur. For resetting the dog 47 within notch 132 upon return of the mechanism, I have provided a reset dog 137 fixedly secured to the end of pivot shaft 57 which strikes a stop pin 138 and thereby forces the dog to rotate until it engages the notch 32.

*Coin clearing mechanism*

The coin clearing mechanism which operates whenever the handle is fully depressed is best shown in Figures 13 and 14. The various parts of the coin receiving assembly of which coin tubes 98 and coin stops 95 form a part are mounted on a common shuttle plate 118. This shuttle plate is slidably mounted on the director plate 122 which in turn is fixed by being secured to the main frame 20. The shuttle plate 118 is held in a horizontally slidable position by a retaining plate 124 which is fixedly secured to shuttle plate 118 by a plurality of screws 126. Shuttle plate 118 and detaining plate 124 thus straddle the coin director plate 122 while the shank of screws 126 ride in slot 127.

A tension spring 120 is fixed between the retaining plate 124 and the director plate 122 and is used to hold the shuttle plate in its normal position. At the opposite side of the shuttle assembly is the coin drop lever 116. This lever is pivotally mounted on the main frame 20 and at its upper end engages the shuttle plate 118. The lower arm of this bell crank type coin drop lever extends into the path of the handle 15 so that when the handle is fully depressed the lever 116 is rotated about its pivot 119, which pulls the shuttle plate toward the lever pivot. When this happens the coin receiver assembly moves to the left as viewed in Figure 14 while the price control rods remain stationary. This rotates the coin stops 95 about their axis which removes the portion 96 from the coin chute and the coins are free to drop through. When the handle is returned to its upper position by means of the spring 33 the lever 116 is released and the spring 120 returns the shuttle plate to its original position.

When the coins drop free of the coin tubes they are directed by the sloping coin chutes 110 and 111 onto the gate 112. This gate is pivotally mounted between the director plate 122 and main frame 20 by the pivot lugs 114 extending from each side of the gate and is normally held in a position to direct all coins to the coin return chute. During the last portion of the vending cycle the gate 112 is rotated by the gate link 115 to a position where the coins are directed into the coin box. The gate link as shown in Figure 6 is connected at its upper end and rotated by the slide guide 62. This insures that the coins, when released, will go into the coin box only when vending takes place and will otherwise be returned to the vendee.

In order to protect the mechanical parts of this machine from the weather the coin slots 80, 81 and 82 are each equipped with a gravity actuated slot cover 140. Each slot cover is round in cross section and has a guide slot 141 in each end which keeps the cover aligned but allows vertical movement as the coin passes through the slot. The coin draw springs 142 shown in Figures 9 and 11 serve as the guides for covers 140 as well as serve to draw the coins into the machine. The slot cover rests normally on shoulder 143 shown in Figure 11. This shoulder has a series of slots or guides 144 in which the ends of springs 142 ride. These slots are spaced farther apart than the slots 141 so that the tension of the springs is taken up by slots 144 thus leaving the slot covers free to move vertically.

As shown in Figure 12 the space between the spring arms is less than the diameter of the coin C so that as the coin is pressed into the slot it first presses the slot cover up and then spreads the spring until it is halfway past the cover. The spring squeezing together then draws the coin into the machine and the cover drops back into position. The lower portion 145 of spring 142 is disposed at an angle directly behind the slot so that as the draw spring draws the coin into the machine the leading edge of the coin strikes the angular spring portion and forces it down so it is directed into the tumbler. This feature avoids the chance of having a coin bridge across the opening leading to the tumbler and thereby rendering the machine inoperative.

Method of operation

When the vendee prepares to obtain a periodical from this machine he first looks at the ports directly above the coin receiver slots and sees just what change is required. On the illustrated machine this could consist of two dimes, two nickels, and two pennies, totaling thirty-two cents or a fraction thereof, but it is to be understood that where a wider range is required this could be arranged for without changing appreciably the basic construction.

When the purchaser is satisfied that he has the correct change, which in this illustration we will assume is one dime and two pennies, he proceeds to insert the three coins. In setting the machine for twelve cents the slide guide 87 showing through the dime port 83 has been fully depressed which leaves the tumbler 93 in its lower or guiding position and leaves the uppermost coin stop projecting into the coin tube 98. Since no nickels are to be used in this purchase the nickel indicator slide has been fully raised which rotates the related tumbler 93 to a position where all nickels inserted into the machine will be returned. The third or penny slide has been lowered to central or mid position which lowers the tumbler and withdraws the upper coin stop from the coin tube so that two pennies are required to operate this unit.

As the coins are inserted into the openings 80 and 82 they spread the downwardly extending legs of the coin draw springs 142 until the coin is halfway in. The tension of the spring 142 at this point draws the coin rapidly into the machine whereupon the coin strikes the lower portion 145 of the spring and is directed down and onto the tumbler 93. The coin now passes over the tumbler and into the coin tube where by riding against extending arm 105 it rotates the tumbler so no further coins will be directed into the coin tube. Since one dime is called for the upper coin stop is in a position to stop the fall of the dime in this position, holding the tumbler in a slightly rotated position. The first penny on the other hand is not stopped until it comes to rest on the lowermost coin stop and therefore falls clear of the tumbler arm 105 and the tumbler is lowered to a position where it will direct the second penny into the coin tube. This second penny comes to rest atop the first and this coin holds this tumbler in the rotated position. Now all three tumblers are in their rotated position.

The vendee now exerts a downward pressure on the extending handle 15 and this causes rotation of the mechanical shaft 22. This rotation causes rotation of the paper holder 36 about the pivot rod 35 which eases up the pressure of the paper holder on the papers. Since yoke 46 is fixedly secured to the mechanical shaft 22 the rotation of the latter causes similar rotation of the yoke. The yoke being drawn downwardly brings with it the dog 47. The fingers 130 rest upon the dog 47 and by gravity attempt to follow the dog in its downward travel but are retarded by the tumbler lugs 134 which have been extended by the rotation of the tumbler. Fingers 130 being thus stopped allow the dog 47 to be pulled free of the retaining notches 132 and the spring 48 rotates the dog into engagement with the catch 50.

As the mechanical shaft continues to rotate this power is transmitted through yoke 46 to dog 47, thence through catch 50 to the stop link 52 which is guided in a substantially vertical path of travel. This upward movement of stop link 52 is transmitted through link 56 to the cam 58 which is kept from rotating about pivot 59 by the slide stop 69 so the bracket 60 which houses pivot 59 is raised. Since bracket 60 is attached to the extending end of slide guide 62 which in turn is fixedly secured to the rotatably mounted vending shaft 63, the upward travel of the pivot 59 causes rotation of the shaft 63. This starts the compression of toggle spring 74. As continued rotation of the mechanical shaft 22 causes further rotation of the vending shaft 63 the vending arm continues its rotation about shaft 63 and since it is gripping the periodical to be vended, succeeds in lifting it from its lower retaining means. When the stop link 52 has neared its upper limit and is ready to be stopped by the fixed shaft 53 the toggle is fully loaded and the handle 15 has contacted the coin drop lever 116. The rotation of the vending shaft 63 and slide guide 62 has now forced down on the gate link 115 and caused the rotation of gate 112 about its pivots 114 so that the gate is in a position to direct all coins away from the coin return chute and into the coin box.

Further depression of the handle simultaneously drops the coins into the coin box and vends the periodical to the purchaser. As the handle is pressed downwardly it exerts pressure on the extending leg of the coin drop lever 116 which is pivotally mounted and which therefore pulls the shuttle plate across the director plate. This withdraws all the coin stops from the coin tubes so the coins are released and fall free onto the coin chutes 110 and 111 which direct them onto the gate 112 which in turn directs them into the coin box. At the same time the toggle has passed "center" and with its store of power released suddenly exerts a continued rotary action on the vending shaft 63 which of course rotates slide guide 62. This action transmitted through bracket 60, lifts cam 58 by its apex pivot 59 which in turn lifts link 56 and stop link 52 until the latter strikes the fixed shaft 53 which in turn stops the link 56 from further upward travel. The cam now starts to rotate upon pivot 59 which pulls the pivot pin 65 and the vending arm 41 to which it is attached through the vending slide toward the vending shaft. Vending shaft 63 and cam 58 continue to rotate until the lug which holds pivot 65 comes to rest against the inner slide stop 68. This stops the rotation of cam 58 which in turn stops the toggle from further rotation of shaft 63. The vending arm 41 is now withdrawn outside of the plane of the paper holder 36 which has insured that the vending arm has lost contact with the periodical, and the paper thereby falls down into slot 45 coming to rest against the stops 44 within easy grasp of the vendee, the paper having thus been vended, the handle is released and the machine returns to neutral.

The return of the machine is accomplished by the handle being pulled upwardly by the return spring 33 and this travel is retarded by the oil check valve 34. The first movement of the handle releases the coin drop lever 116. The shuttle plate return spring 120 returns the shuttle plate to its normal position which returns the coin stops to their original engaging position. As the mechanical shaft 22 is rotated by the return of the handle this carries with it yoke 46 and dog 47 while the catch 50 remains motionless. When yoke 46 is rotated part way the dog pivot rod 57 comes to bear on the lower corner of the catch 50, and the catch is forced into rotation with the shaft 22. This draws down on the stop link 52 which carries with it link 56. This movement is transmitted through cam 58 to bracket 60 thence through slide guide 62 to the shaft 63 which starts rotating and this commences to compress the toggle spring 74. Here as in the vending operation the action is relatively simple until the last portion of the return when several actions occur simultaneously. When stop link 52 has almost reached the limit of slot 54, the toggle has again reached "center" and its power puts a sudden surge in the rotation of shaft 63. This carries the stop link to its lower limit, then with pivot 55 unable to move, link 56 causes cam 58 to start rotating which extends the vending slide until slide stop 69 halts this extension. This stops the rotation of shaft 63 and the vending arm is in engagement with the next periodical.

At the same time this is occurring the shaft 22 and its affixed yoke 46 are rotating. The yoke having reached the point where the reset dog 137 has contacted the reset stop 138 the dog 47 starts to rotate about its axis pin 57. This rotation causes it to press upwardly and rake across the lower surface of the fingers 130 which lifts these fingers and the reset springs which are attached thereto out of engagement with the tumbler lugs 134. With this obstacle removed the tumblers are allowed to drop back into position to direct the next coins into the coin tubes. The dog 47 continues to rotate and rake the fingers until the notches 132 are reached at which time the fingers drop so that they engage the dog which has now stopped its travel.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

I claim:

1. A coin operated control device for a vending mechanism, comprising: a housing; a plurality of parallel finger members mounted in said housing to pivot in a vertical plane; a dog plate mounted transversely of said finger members, said dog plate and each finger member having interengaging means to prevent movement of said dog plate in one direction longitudinally of said finger members; spring means tending to move said dog plate in said direction; a manually operable operating handle, said dog plate being connected to said operating handle to move in a path of travel laterally away from said finger members as said operating handle is operated for initiating vending; a catch member for operating the vending mechanism having one end disposed contiguous the path of said dog plate away from said finger members in position to engage said dog plate when said dog plate is disengaged from the finger members and is biased from its finger member engaging position by said spring means; and said finger members being disposed normally to follow said dog plate in its path of travel, and a coin receiving mechanism for each finger member having means for engaging the free end of its finger member to prevent it from following said dog plate in its path of travel and to thereby disengage it from said dog plate when a previously determined sum has been deposited in said coin receiving mechanism, whereby when the customer has deposited the correct amount of money each coin receiving mechanism engages the free end of its finger member and said dog plate is disengaged from the finger members as it moves in said path of travel and said dog plate is engaged by said catch member to move with said dog plate thereby operating the vending mechanism.

2. The subject matter of claim 1 in which there is a stop connected to said housing and a reset dog connected to said dog plate disposed to engage said stop and to move said dog plate to its finger member engaging position when said dog plate returns to its original position at the end of the vending cycle.

3. The subject matter of claim 1 in which said coin receiving mechanism comprises: a plurality of tumblers pivotally disposed in said housing, one for each finger member; a coin tube disposed below each tumbler, each tumbler having a downwardly extending chute arm disposed in said coin tube and the tumbler being disposed to direct coins deposited in the housing into said coin tube; stop means in each coin tube for positioning coins therein in position to wedge between said chute arm and the side of said coin tube to move said tumbler from a first inoperative position to a second operative position; each tumbler having a lug thereon disposed to engage the associated finger member in said second operative position to prevent the finger member from following said dog plate in its path of travel.

4. A coin operated control device for a vending mechanism, comprising: a housing; a finger member pivotally mounted in said housing; a dog plate positioned adjacent said finger member, said dog plate and said finger member having interengaging means to prevent movement of said dog plate in one direction longitudinally of said finger member; spring means tending to move said dog plate in said direction; a manually operable operating handle, said dog plate being connected to said operating handle to move in a path of travel laterally away from said finger member as said operating handle is operated for initiating vending; a catch member for operating the vending mechanism having one end disposed contiguous the path of said dog plate away from said finger member in position to engage said dog plate when said dog plate is disengaged from said finger member and is biased from its finger member engaging position by said spring means; and said finger member being disposed normally to follow said dog plate in its path of travel, and a coin receiving mechanism for said finger member having means for engaging the free end of said finger member to prevent it from following said dog plate in its path of travel and to thereby disengage it from said dog plate when a previously determined sum has been deposited in said coin receiving mechanism, whereby when the customer has deposited the correct amount of money said coin receiving mechanism engages the free end of said finger member and said dog plate is disengaged from said finger member as it moves in said path of travel and said dog plate is engaged by said catch member to move with said dog plate thereby operating the vending mechanism.

5. A coin operated control device for a vending mechanism, comprising: a housing; a plurality of parallel finger members mounted in said housing to pivot in parallel planes; a dog plate mounted transversely of said finger members, said dog plate having an opening therein, said dog plate and each finger member having interengaging means to prevent movement of said dog plate in one direction longitudinally of said finger members; spring means tending to move said dog plate in said direction; a manually operable operating handle, said dog plate being connected to said operating handle to move laterally in a path of travel away from said finger members as said operating handle is operated for initiating vending; said finger members being positioned to normally follow said dog plate in its path of travel by force of gravity; a catch member for operating the vending mechanism having one end disposed contiguous the path of said dog plate in position to be engaged in said opening and to be moved therewith when said dog plate is disengaged from the finger members and is biased from its finger member engaging position by said spring means, said catch member being adapted to operate the vending mechanism when moved by said dog plate; and a coin receiving mechanism for each finger member having means for engaging the free end of its finger member to prevent it from moving with said dog plate when a previously determined sum has been deposited in said coin receiving mechanism and thereby to separate said dog plate from said finger members and to separate said interengaging means permitting said dog plate to move in said one direction longitudinally of said finger members and to engage said catch member in said opening, moving said catch member and operating the vending mechanism.

6. A coin operated control device for a vending mechanism, comprising: a housing; a manually operable handle for vending; said housing having a plurality of coin slots, indicia on said housing indicating the denomination of coins to be used in each slot, each slot being sized to pass no objects larger than the coin indicated by said indicia; a plurality of tumblers pivotally mounted in said housing, each tumbler being associated with one of said slots and having one end disposed to receive coins deposited in the slot, said end being in the form of a slide and having an opening therein over which the coins will pass, said opening being of such a size that objects smaller than coins indicated to be deposited in the associated slot will fall through said opening to be returned to the vendee; a coin tube disposed below each tumbler, each tumbler having a downwardly extending chute arm joining said slide disposed in its coin tube thereby directing coins deposited in the associated coin slot into the associated coin tube; a removable stop in each coin tube to prevent coins in the tube from descending below said stop, said stop being positioned so that coins stopped thereby will be in position to wedge between said chute arm and a side of the coin tube to pivot the tumbler from a first inoperative position to a second operative position; means in said housing permitting vending only when all of said tumblers are in said second operative position; and means for removing said removable stop from coin stopping position upon operation of said operating handle so that coins may fall through said coin tubes.

7. The subject matter of claim 6 in which said means permitting vending includes a finger member mounted in said housing to pivot in a vertical plane about one end, said tumbler having a lug thereon disposed to engage the free end of said finger member in said second operative position.

8. A coin operated control device for a vending mechanism, comprising: a housing having a coin slot; a tumbler pivotally mounted in said housing and disposed to receive coins deposited in said slot; a coin tube disposed below said tumbler, said tumbler having a downwardly extending chute arm disposed in said coin tube thereby directing coins deposited in the coin slot into said coin tube; a stop in said coin tube to prevent coins in said tube from descending below said stop, said stop being movable vertically to a plurality of levels at which levels the top coin of one or more coins on said stop will be in position to wedge between said chute arm and a side of the coin tube to pivot the tumbler from a first inoperative position to a second operative position; means disposed in said housing permitting vending only when said tumbler is in said second operative position; means for moving said stop vertically to said levels including indicia for indicating how many coins are required on said stop to dispose the top coin at a level in wedging position to move said tumbler to said second operative position.

9. A coin operated control device for a vending mechanism, comprising: a housing; a plurality of parallel finger members mounted in said housing to pivot in a vertical plane about one end; a dog plate mounted transversely under said finger members, said dog plate and each finger member having interengaging means to prevent movement of said dog plate in one direction longitudinally of said finger members; spring means tending to move said dog plate in said direction; a manually operable operating handle, said dog plate being connected to said operating handle to move downward laterally away from said finger members as said operating handle is operated for initiating vending; said finger members being positioned to normally follow said dog plate in its path of travel by force of gravity; a catch member for operating the vending mechanism having one end disposed contiguous the downward path of said dog plate in position to engage said dog plate to be moved therewith when said dog plate is disengaged from the finger members and is biased from its finger member engaging position by said spring means, said catch member being adapted to operate the vending mechanism when moved by said dog plate; and a coin receiving mechanism for each finger member having means for engaging the free end of its finger member to prevent it from moving downward with said dog plate when a previously determined sum has been deposited in said coin receiving mechanism and thereby to separate said dog plate from said finger members and to separate said interengaging means permitting said dog plate to move in said one direction longitudinally of said finger members and to engage said catch member, moving said catch member and operating the vending mechanism.

10. A coin operated control device for a vending mechanism, comprising: a housing; a finger member mounted therein to pivot in a vertical plane; a dog member mounted under said finger member, said dog member and said finger member having interengaging means to prevent movement of said dog member in one direction longitudinally of said finger member; spring means tending to move said dog member in said direction; a manually operable operating handle, said dog member being connected to said operating handle to move downward laterally away from said finger member as said operating handle is operated for initiating vending; said finger member being disposed to normally follow said dog member in its path of travel by force of gravity; a catch member for operating the vending mechanism having one end disposed contiguous the downward path of said dog member to be moved therewith in position to engage said dog member when said dog member is disengaged from said finger member and is biased from its finger member engaging position by said spring means, said catch member being adapted to operate the vending mechanism when moved by said dog member; and a coin receiving mechanism for said finger member having means for engaging the free end of said finger member to prevent it from moving downward with said dog member when a previously determined sum has been deposited in said coin receiving mechanism and thereby to separate said dog member from said finger member and to separate said interengaging means permitting said dog member to move in said one direction longitudinally of said finger member and to engage said catch member, moving said catch member and operating the vending mechanism.

References Cited in the file of this patent

UNITED STATES PATENTS

| | | |
|---|---|---|
| 625,428 | Sullivan | May 23, 1899 |
| 683,660 | Price | Oct. 1, 1901 |